United States Patent
Fan

(10) Patent No.: US 11,831,190 B2
(45) Date of Patent: Nov. 28, 2023

(54) ELECTRONIC APPARATUS AND CHARGING METHOD THEREOF, AND STORAGE MEDIUM

(71) Applicant: Beijing Xiaomi Mobile Software Co., Ltd., Beijing (CN)

(72) Inventor: Jie Fan, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 352 days.

(21) Appl. No.: 17/098,791

(22) Filed: Nov. 16, 2020

(65) Prior Publication Data

US 2021/0336446 A1 Oct. 28, 2021

(30) Foreign Application Priority Data

Apr. 26, 2020 (CN) .......................... 202010338400.9

(51) Int. Cl.
*H02J 7/00* (2006.01)
*H02M 3/07* (2006.01)

(52) U.S. Cl.
CPC ............... *H02J 7/007* (2013.01); *H02M 3/07* (2013.01); *H02J 2207/20* (2020.01)

(58) Field of Classification Search
CPC ...... H02J 7/007; H02J 2207/20; H02J 7/0068; H02M 3/07
See application file for complete search history.

(56) References Cited

U.S. PATENT DOCUMENTS

| | | | |
|---|---|---|---|
| 10,971,942 B2 * | 4/2021 | Jung | ...................... H01M 10/44 |
| 2008/0036426 A1 * | 2/2008 | Kung | ........................ H02J 7/04 |
| | | | 320/160 |
| 2011/0234174 A1 | 9/2011 | Chen | |
| 2015/0236547 A1 * | 8/2015 | Davis | ........................ G06F 1/26 |
| | | | 320/111 |

FOREIGN PATENT DOCUMENTS

EP 2 897 270 A1 7/2015

OTHER PUBLICATIONS

Extended European Search Report in European Application No. 20209137.7, dated Jun. 1, 2021.

* cited by examiner

*Primary Examiner* — Richard Isla
*Assistant Examiner* — Sadia Kousar
(74) *Attorney, Agent, or Firm* — Finnegan, Henderson, Farabow, Garrett & Dunner, L.L.P

(57) ABSTRACT

An electronic apparatus includes: a display; a processor configured to, when a battery of the electronic apparatus is to be charged, obtain a display state of the display and generate a mode-selection signal according to the display state; and a battery management circuit connected to the processor and configured to, upon receiving the mode-selection signal, switch to one of a charge pump charging mode or a direct charging mode based on the mode-selection signal to charge the battery.

13 Claims, 10 Drawing Sheets

ELECTRONIC APPARATUS AND CHARGING METHOD THEREOF, AND STORAGE MEDIUM

CROSS REFERENCE TO RELATED APPLICATIONS

This application is based upon and claims priority to Chinese Patent Application No. 202010338400.9 filed on Apr. 26, 2020, the content of which is incorporated herein by reference in its entirety.

TECHNICAL FIELD

The present disclosure relates to charging technologies, and in particular, to an electronic apparatus and a charging method of the electronic apparatus.

BACKGROUND

As the display screen of the electronic apparatus becomes increasingly large, the power consumption also increases, which requires acceleration of charging speed of the battery. In some approaches, the electronic apparatus usually charges the battery by means of a charge pump, so as to satisfy the requirement of the charging speed. However, when the charge pump is used for charging, since a plurality of switching transistors in the electronic apparatus operate at a high switching frequency, the heat loss is increased, so that the temperature of the electronic apparatus becomes high, triggering charging protection and thus the charging fails, which is unsuitable for using the electronic apparatus while charging.

SUMMARY

According to a first aspect of embodiments of the present disclosure, an electronic apparatus includes: a display; a processor configured to, when a battery of the electronic apparatus is to be charged, obtain a display state of the display and generate a mode-selection signal according to the display state; and a battery management circuit connected to the processor and configured to, upon receiving the mode-selection signal, switch to one of a charge pump charging mode or a direct charging mode based on the mode-selection signal to charge the battery.

According to a second aspect of embodiments of the present disclosure, a charging method is applied to an electronic apparatus including a display, a processor, and a battery management circuit. The method includes: obtaining, by the processor, a display state of the display when a battery of the electronic apparatus is to be charged; generating, by the processor, a mode-selection signal based on the display state and sending the mode-selection signal to the battery management circuit; and upon receiving the mode-selection signal, switching, by the battery management circuit, to one of a charge pump charging mode or a direct charging mode based on the mode-selection signal to charge the battery.

According to a third aspect of embodiments of the present disclosure, a non-transitory computer-storage medium has stored thereon instructions that, when executed by a processor of an electronic apparatus including the processor, a display, and a battery management circuit, cause the electronic apparatus to perform a charging method, the method including: obtaining, by the processor, a display state of the display when a battery of the electronic apparatus is to be charged; generating, by the processor, a mode-selection signal based on the display state and sending the mode-selection signal to the battery management circuit; and upon receiving the mode-selection signal, switching, by the battery management circuit, to one of a charge pump charging mode or a direct charging mode based on the mode-selection signal to charge the battery.

The above general description and the following details are only exemplary and explanatory, which cannot limit the present disclosure.

BRIEF DESCRIPTION OF DRAWINGS

The accompanying drawings herein are incorporated in and constitute a part of this description, illustrate embodiments consistent with the present disclosure, and together with the description serve to explain the principles of the present disclosure.

DETAILED DESCRIPTION

Exemplary embodiments will be described in detail herein, examples of which are shown in the accompanying drawings. When the following description refers to the drawings, unless otherwise indicated, the same numerals in the different figures represent the same or similar elements. The following exemplary embodiments do not represent all embodiments consistent with the present disclosure. Rather, they are merely examples of devices consistent with some aspects of the disclosure as detailed in the appended claims.

Embodiments of the present disclosure provide an electronic apparatus including an improved configuration of a battery management circuit in the electronic apparatus, so as to support a charge pump charging mode and a direct charging mode. In this way, when the battery management circuit receives a mode-selection signal generated by a processor according to the display state of the display, the battery management circuit can switch to the charge pump charging mode or the direct charging mode based on the mode-selection signal to charge the battery, thereby improving the charging efficiency.

For convenience of description, circuits or modules involved in improvement in the electronic apparatus, and circuits or modules connected thereto are described. It can be understood that the electronic apparatus may include more or less than the described circuits or modules, for example, the electronic apparatus may include a current protection circuit, a voltage protection circuit, a temperature protection circuit, etc.

Figure 1:
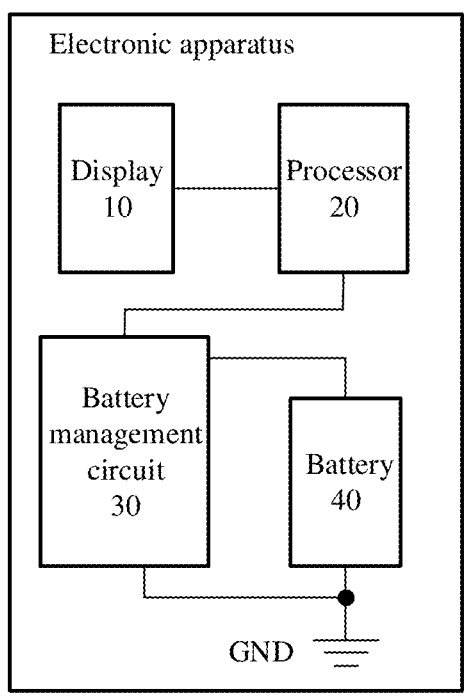
FIG. 1 is a block diagram of an electronic apparatus according to an exemplary embodiment.

FIG. 1 is a block diagram of an electronic apparatus according to an exemplary embodiment. Referring to FIG. 1, the electronic apparatus includes a display 10, a processor 20, a battery management circuit 30, and a battery 40.

The processor 20 may be electrically connected to the display 10, and when the battery 40 needs to be charged, the processor 20 is configured to obtain a display state of the display 10 and generate a mode-selection signal according to the display state.

The battery management circuit 30 is connected to the processor 20. When receiving the mode-selection signal generated by the processor 20, the battery management circuit 30 is configured to switch to a charge pump charging mode or a direct charging mode to charge the battery 40 based on the mode-selection signal.

In an embodiment, the processor 20 obtains a display state of the display 10, and the display state includes an off-screen state and a bright-screen state. The obtaining method may include: the processor sending a request for a state of the display, and obtaining a voltage at a specified pin, through a control instruction in a communication bus, and the like.

Furthermore, the processor 20 may take an instant display state of the display 10 as the obtained display state, or may take a display state lasting for a preset duration (for example, 1 minute) as the obtained display state. The method for obtaining the display state of the display may be selected according to a specific scenario. For example, the processor may start a time counter upon obtaining the display state, determine whether the obtained display state is maintained for a preset duration (for example, 1 minute), and determine the display state as a valid display state upon determining that the display state is maintained for a preset duration. Thus, it is ensured that the detected display state is in a steady state, avoiding frequently switching of the charging mode caused by frequent switching between the bright-screen state and the off-screen state.

In some embodiments, the mode-selection signal includes a signal indicating charging under the charge pump charging mode in the off-screen state and a signal indicating charging under the direct charging mode in the bright-screen state. The charge pump charging mode may be a mode in which the battery 40 is charged by the charge pump control circuit. The direct charging mode may be a mode in which the battery 40 is charged by the direct charge control circuit.

In some embodiments, the direct charging mode has the features of small heat loss and high charging conversion efficiency (possibly up to 99%), and therefore the temperature of the battery 40 will not change much when the direct charging mode is used, so that the electronic apparatus may run more applications and/or components, such as the display 10. That is, when the direct charging mode is adopted for charging, a sufficient amount of heat dissipation space may be reserved for other devices in the electronic apparatus, to ensure that the temperature of the electronic apparatus is kept in a suitable range. In other words, the electronic apparatus can be used by a user while charging the battery under the direct charging mode, and the temperature of the battery 40 continuously increases without reaching a burning hot degree.

In another embodiment, in the charge pump charging mode, when a charger supports a charging current of, e.g., 5 A, a data line needs to support the charging current of 5 A. If a double current is used to charge the battery, the charging current of the battery may reach 10 A. Therefore, the charge pump charging mode has the features of a large charging current and a high heat loss (2%-3%) and a short charging time. Thus, when the charge pump charging mode is adopted, there is a large influence on the temperature of the battery 40. Experiments confirms that the battery temperature in the charge pump charging mode may be about 2 degrees centigrade higher than the battery temperature in the direct charging mode. In this case, if the electronic apparatus runs more applications or other components, it is possible to trigger the temperature protection circuit of the electronic apparatus, and therefore the application or component with a large power consumption has to be turned off, for example, the display has to be turned off. In other words, while the electronic apparatus is not used, the charge pump charging mode may be adopted, so the charging time can be shortened and the temperature of the electronic apparatus is allowed to be properly increased.

Figure 2:
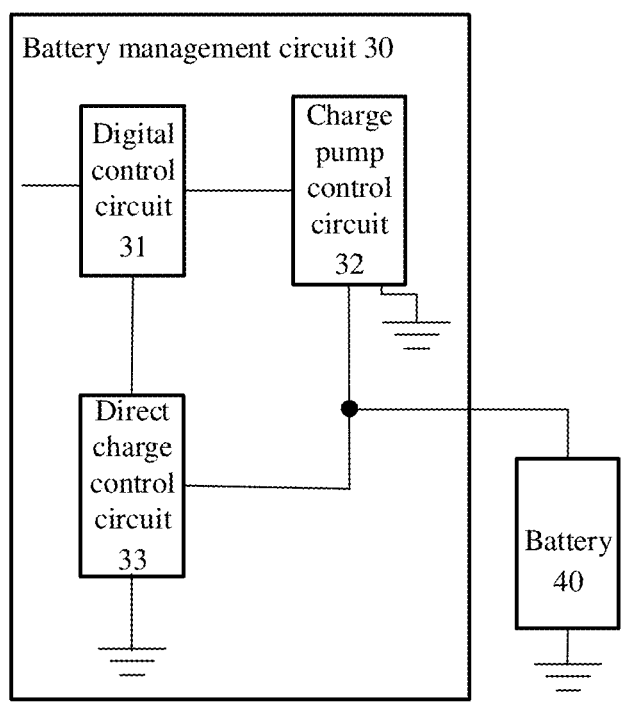
FIG. 2 is a block diagram of a battery management circuit according to an exemplary embodiment.

FIG. 2 is a block diagram of the battery management circuit 30 (FIG. 1) according to an exemplary embodiment. Referring to FIG. 2, the battery management circuit 30 includes a digital control circuit 31, a charge pump control circuit 32, and a direct charge control circuit 33. A first terminal of the digital control circuit 31 is connected to processor 20 (not shown in FIG. 2), a second terminal of the digital control circuit 31 is connected to a second terminal of the charge pump control circuit 32, and a third terminal of the digital control circuit 31 is connected to a first terminal of the direct charge control circuit 33. A first terminal of the charge pump control circuit 32 and a second terminal of the direct charge control circuit 33 are connected to the battery 40. The digital control circuit 31 is configured to generate a circuit control instruction signal based on the mode-selection signal, in response to receiving the mode-selection signal. The digital control circuit 31 is further configured to send a circuit control instruction signal to the charge pump control circuit 32 and the direct charge control circuit 33, so as to control the power supply to charge the battery 40 through one of the charge pump control circuit 32 or the direct charge control circuit 33.

In the above embodiment, the processor may obtain a display state, for example, a bright-screen state or an off-screen state, of the display, and may generate a mode-selection signal according to the display state; upon receiving the mode-selection signal, the battery management circuit may switch to the charge pump charging mode or the direct charging mode to charge the battery. For example, the direct charging mode is used for charging in the bright-screen state, such that the temperature of the electronic apparatus is within a reasonable range during charging process. For another example, the charge pump charging mode is used for charging in the off-screen state, such that the charging time may be shortened.

Figure 3:
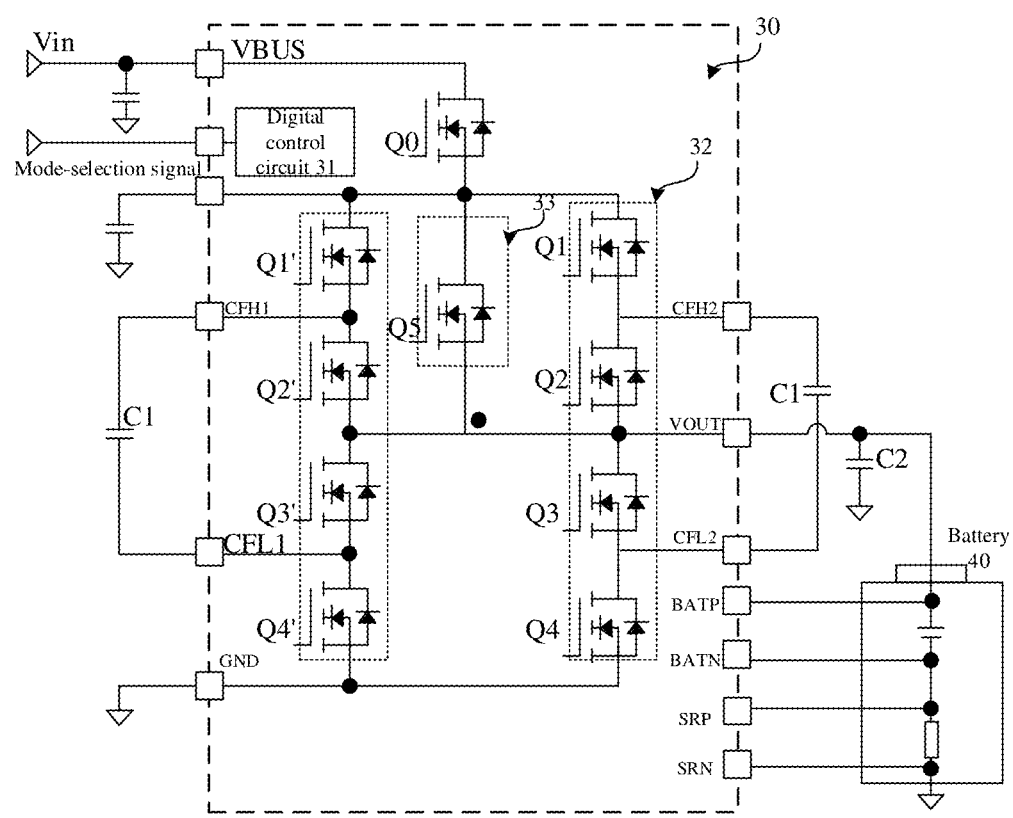
FIG. 3 is a circuit diagram of a battery management circuit according to an exemplary embodiment.

FIG. 3 is a circuit schematic diagram of the battery management circuit 30 (FIG. 1) according to an exemplary embodiment. Referring to FIG. 3, when the battery management circuit 30 receives the mode-selection signal, the digital control circuit 31 may control a charging switching device Q0 to be turned on, and a current channel may be formed between the power supply Vin and the battery 40 through the charge pump control circuit 32 or the direct charge control circuit 33; when the battery management circuit 30 does not receive the mode-selection signal or receives a signal indicating that charging is not required, a current path is not formed between the power supply Vin and the battery 40, and the battery 40 is not charged.

In some embodiments, the battery management circuit 30 may include at least one charge pump control circuit. FIG. 3 illustrates a case where two charge pump control circuits are provided and the circuit structures of the two charge pump control circuits are the same. Referring to FIG. 3, taking one charge pump control circuit as an example, a charge pump control circuit 32 includes a first switching device Q1, a second switching device Q2, a third switching device Q3, and a fourth switching device Q4. A first terminal of the first switching device Q1 is electrically connected to the power supply (Vin) (for example, through Q0). A second terminal of the first switching device Q1 is electrically connected to a first terminal of the second switching device Q2, and is electrically connected to a first terminal of a first capacitor C1 outside the charge pump control circuit 32. A first terminal of the third switching device Q3 is electrically connected to the second terminal of the second switching device Q2, and is electrically connected to a first terminal of a second capacitor C2 outside the charge pump control circuit 32, and a second terminal of the second capacitor C2 is grounded. A first terminal of the fourth switching device Q4 is electrically connected to the second terminal of the third switching device Q3, and is electrically connected to a second terminal of the first capacitor C1. A second terminal of the fourth switching device Q4 is grounded. The first switching device Q1, the second switching device Q2, the third switching device Q3 and the fourth switching device Q4 are electrically connected to the digital control circuit 31.

The battery is charged in the charge pump charging mode and one charge pump control circuit is taken as an example. Referring to FIG. 3, FIG. 4A, FIG. 4B, FIG. 5A and FIG. 5B, during one charging cycle, first and second stages are included as follows.

Figure 4A:
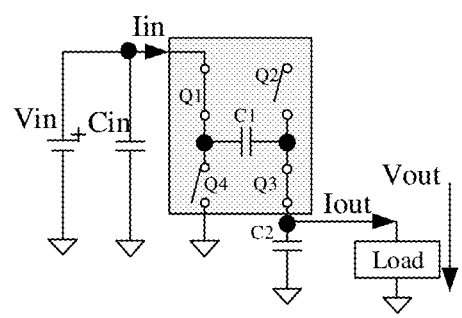
FIG. 4A is a circuit diagram illustrating a connection of switching devices at a first stage according to an exemplary embodiment.
Figure 4B:
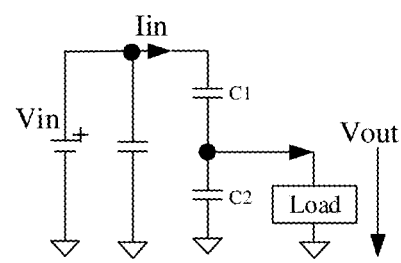
FIG. 4B is an equivalent circuit diagram of the circuit diagram at the first stage according to an exemplary embodiment.

In the first stage, the first switching device Q1 and the third switching device Q3 are turned on, and the second switching device Q2 and the fourth switching device Q4 are turned off. A circuit diagram of the connection of the switching devices is shown in FIG. 4A, and its equivalent circuit diagram is shown in FIG. 4B. At this time, the first capacitor C1 and the second capacitor C2 are in series, and the second capacitor C2 is grounded. Assuming that the capacitance of the first capacitor C1 is the same as the capacitance of the second capacitor C2, the voltage across the second capacitor C2 is equal to the voltage across the first capacitor C1, that is, the voltage across the second capacitor C2 is equal to a half of the input voltage Vin. During the process, the (external) power supply Vin charges the first capacitor C1 and the second capacitor C2, and the energy stored in the first capacitor C1 and the second capacitor C2 is the same.

Figure 5A:
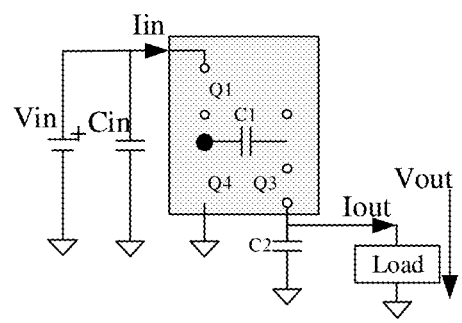
FIG. 5A is a circuit diagram illustrating a connection of switching devices at a second stage according to an exemplary embodiment.
Figure 5B:
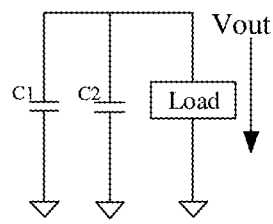
FIG. 5B is an equivalent circuit diagram of the circuit diagram at the second stage according to an exemplary embodiment.

In the second stage, the second switching device Q2 and the fourth switching device Q4 are turned on, and the first switching device Q1 and the third switching device Q3 are turned off. A circuit diagram of the connection of the switching devices is shown in FIG. 5A, and its equivalent circuit diagram is shown in FIG. 5B. At this time, the first capacitor C1 and the second capacitor C2 in series state shown in FIG. 4B are changed to be in parallel. Since the first capacitor C1 and the second capacitor C2 are connected in parallel, and the stored energy of the first capacitor C1 and the second capacitor C2 are the same, that is, $VC1=VC2=Vout$. In particular, at the initial moment of the second stage, $VC1=VC2=Vout=½Vin$. At this stage, the first capacitor C1 and the second capacitor C2 charge the battery 40. The energy stored in the first capacitor C1 and the second capacitor C2, according to the law of conservation of energy, the output voltage is one half of the input voltage, and the output current is twice the input current, so that the voltage is halved and the current is doubled.

In the charge pump charging mode of the above embodiments, in the process of alternately charging the battery through the first stage and the second stage, the digital control circuit 31 may further configured to determine the charging current based on the battery voltage and the actual temperature inside the electronic apparatus, such that the battery is kept charged when the temperature of the electronic apparatus does not exceed a preset temperature. The process may use an adjustment method of the charging current in related technologies, which is not limited here.

In an embodiment, the battery management circuit 30 may control multiple, for example, two charge pump control circuits to work in time-sharing manner, such that the heat loss of each switching device in the charge pump control circuit is within a reasonable range.

Still referring to FIG. 3, the battery management circuit 30 may include a direct charge control circuit 33, which includes a fifth switching device Q5. A first terminal of the fifth switching device Q5 is electrically connected to the power supply Vin, and a second terminal of the fifth switching device Q5 is electrically connected to the second terminal of the second switching device Q2. A control terminal of the fifth switching device Q5 is electrically connected to the digital control circuit 31. For example, the fifth switching device Q5 includes a field-effect transistor, a first diode, and a second diode. A drain of the field-effect transistor is electrically connected to a first terminal of the fifth switching device Q5, and a source of the field-effect transistor is electrically connected to a second terminal of the fifth switching device Q5, and a gate of the field-effect transistor is electrically connected to the control terminal of the fifth switching device Q5. A cathode of the first diode is electrically connected to a drain of the field-effect transistor, an anode of the first diode is electrically connected to an anode of the second diode, and a cathode of the second diode is electrically connected to the source of the field-effect transistor. By connecting the anodes of the first diode and the second diode, the battery current may be prevented from backflowing, which is helpful to maintaining the battery power.

In the above embodiment, the field-effect transistor of the fifth switching device Q5 is a low-impedance field-effect transistor, that is, the field-effect transistor's impedance is less than or equal to the preset impedance, where the preset impedance may be selected according to the specific scenario. As such, the heat generated by the field-effect transistor is effectively reduced, which is helpful to reducing the real-time temperature of the electronic apparatus.

The process of controlling battery charging by the battery management circuit 33 is described below, with reference to FIG. 1 to FIG. 3.

When the electronic apparatus is connected to a charger, the electronic apparatus and the charger complete a handshake to determine the charging parameters supported by the electronic apparatus, such as charging voltage, charging current, or charging power. After that, when the processor determines that the electronic apparatus needs to be charged, the processor may obtain the display state of the display.

In the case that the display state is the off-screen state, the processor may generate a mode-selection signal indicating that the charge pump charging mode is adopted, and send the mode-selection signal to a mode-selection pin of the battery management circuit. When the digital control circuit in the battery management circuit receives the mode-selection signal, the digital control circuit may generate a circuit control instruction signal, controlling the direct charge control circuit to be turned off, and controlling the charge pump control circuit to be turned on. That is, while turning off the fifth switching device Q5, alternately turning on both of the first switching device Q1 and the third switching device Q3, and both of the second switching device Q2 and the fourth switching device Q4.

For example, the first switching device Q1 and the third switching device Q3 are turned on, and the second switching device Q2 and the fourth switching device Q4 are turned off. In this case, the path of the charging current is represented as: starting from the power supply Vin and passing through the first switching device Q1, the first capacitor C1, and the third switching device Q3, and finally arriving at the battery.

For another example, the first switching device Q1 and the third switching device Q3 are turned off, and the second switching device Q2 and the fourth switching device Q4 are turned on. In this case, the path of the charging current is represented as: the first capacitor C1 and the second capacitor C2 is connected in parallel to charge the battery.

For the charging process in the charge pump charging mode, reference may be made to the above details of the charge pump control circuit, which will not be repeated here.

In the case that the display state is the bright-screen state, the processor may generate a mode-selection signal indicating that the direct charging mode is adopted, and send the mode-selection signal to a mode-selection pin of the battery management circuit. When the digital control circuit in the battery management circuit receives the mode-selection signal, the digital control circuit may generate a circuit control instruction signal, controlling the direct charge control circuit to be turned on, and controlling the charge pump control circuit to be turned off. That is, while the first switching device Q1, the second switching device Q2, the third switching device Q3 and the fourth switching device Q4 are turned off, controlling the fifth switching device Q5 to be turned on. In this case, the path of the charging current is represented as: starting from the power supply, passing through the fifth switching device, and finally arriving at the battery.

In some embodiments, when the direct charging mode is used for charging, if the direct charging mode is turned off, a switch to the charge pump charging mode is performed. Due to a parasitic capacitance on the charging circuit, the charging circuit may not seamlessly switch to the charge pump charging mode. That is, there will be a switching time in an order of seconds between the direct charging mode and the charge pump charging mode. During the switching time, if the electronic apparatus is inserted into the interface of another device, the battery 40 will charge the other device, which may trigger protection action or abnormal operation on another device. Therefore, the electronic apparatus further includes a discharge circuit. The first terminal of the discharge circuit is connected to the battery, the second terminal of the discharge circuit is grounded, and the control terminal of the discharge circuit is electrically connected to the processor or the battery management circuit. The processor or the battery management circuit is further configured to generate a discharge control instruction signal when stopping charging the battery, and send the discharge control instruction signal to the control terminal of the discharge circuit. The discharge circuit is configured to discharge the parasitic capacitance on the power line (such as Q0) between the power supply and the battery management circuit upon receiving the discharge control instruction signal, so as to eliminate the residual voltage on the power line as soon as possible.

Figure 6:
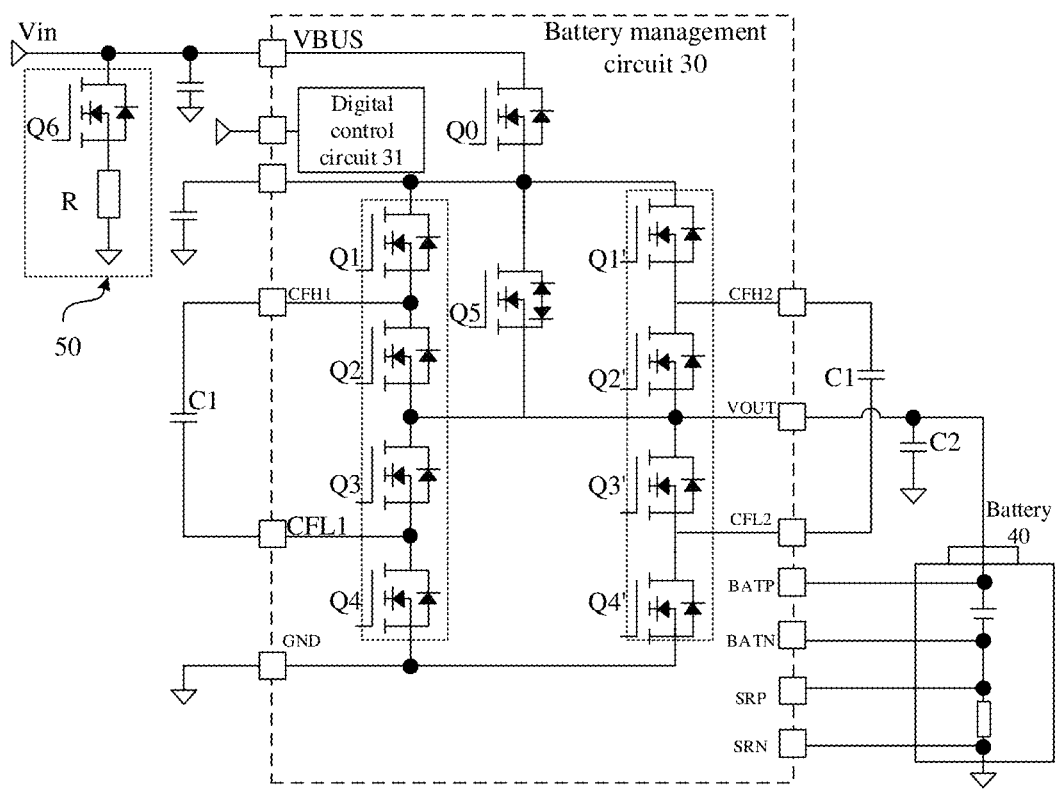
FIG. 6 is a circuit diagram of a battery management circuit according to an exemplary embodiment.

FIG. 6 is a circuit schematic diagram of the battery management circuit 30 (FIG. 1) according to an exemplary embodiment. Referring to FIG. 6, a discharge circuit 50 includes a sixth switching device Q6 and a discharge resistor R. A first terminal of the sixth switching device Q6 is electrically connected to the power supply, and a second terminal of the sixth switching device Q6 is electrically connected to a first terminal of the discharge resistor R. A second terminal of the discharge resistor R is grounded. A control terminal of the sixth switching device Q6 is electrically connected to the processor or the battery management circuit. During the charging process, if the charging interface of the electronic apparatus is unplugged from the power supply, the processor or the battery management circuit immediately controls the sixth switching device Q6 to be turned on. At this time the second capacitor C2, the fifth switching device Q5, and the charging switching device Q0, the sixth switching device Q6 and the discharge resistor R form a discharge circuit, which may release the charges of the first capacitor C1, the second capacitor C2 and the parasitic capacitor through the discharge resistor R, and thus there is no residual voltage on the power line so as to protect other device.

Figure 7:
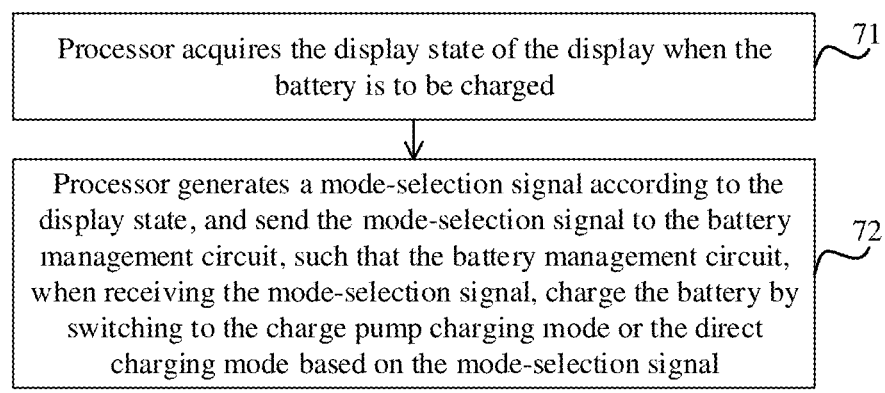
FIG. 7 is a flowchart of a charging method according to an exemplary embodiment.

Based on the electronic apparatus in FIG. 1 to FIG. 6, embodiments of the present disclosure provide a charging method. FIG. 7 is a flowchart of a charging method according to an exemplary embodiment. Referring to FIG. 7, the charging method includes the following steps.

In step 71, the processor obtains the display state of the display when the battery is to be charged.

In step 72, the processor generates a mode-selection signal according to the display state, and sends the mode-selection signal to the battery management circuit, such that the battery management circuit, when receiving the mode-selection signal, switch to the charge pump charging mode or the direct charging mode to charge the battery based on the mode-selection signal.

Figure 8:
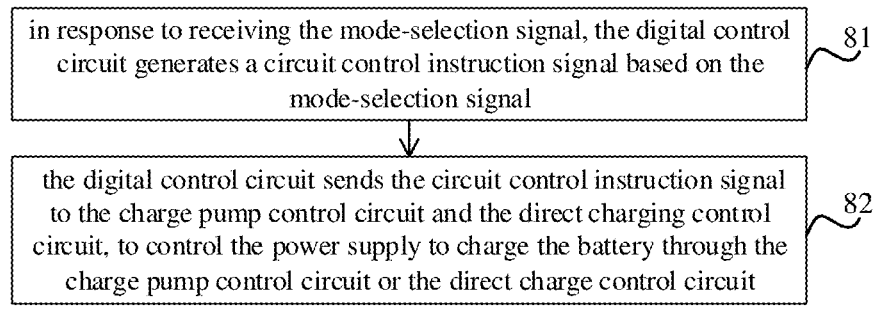
FIG. 8 is a flowchart of a charging method according to an exemplary embodiment.

In some embodiments, the battery management circuit includes a digital control circuit, a charge pump control circuit and a direct charge control circuit. Referring to FIG. 8, the method further includes the following steps.

In step 81, in response to receiving the mode-selection signal, the digital control circuit generates a circuit control instruction signal based on the mode-selection signal.

In step 82, the digital control circuit sends the circuit control instruction signal to the charge pump control circuit and the direct charge control circuit, to control the power supply to charge the battery through one of the charge pump control circuit or the direct charge control circuit.

In some embodiments, when there is more than one charge pump control circuit, such as two charge pump control circuits, the battery management circuit controls the power supply to charge the battery through at least one of the two charge pump control circuits.

In some embodiments, the direct charge control circuit includes a fifth switching device. A first terminal of the fifth switching device is electrically connected to the power supply, and a second terminal of the fifth switching device is electrically connected to the second terminal of the second switching device. The control terminal of the fifth switching device is electrically connected to the digital control circuit; the method further includes: the digital control circuit sending a circuit control instruction signal to the fifth switching device and the charge pump control circuit, wherein the circuit control instruction signal instructs the fifth switching device to be turned on and the charge pump control circuit to be turned off, so as to control the power supply to charge the battery through the fifth switching device.

Figure 9:
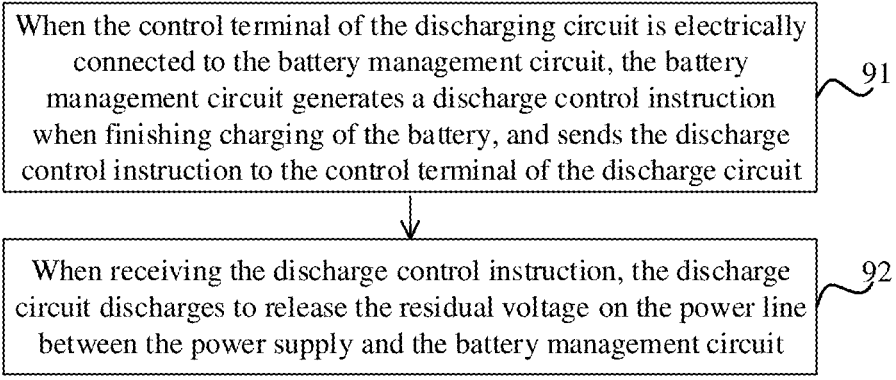
FIG. 9 is a flowchart of a charging method according to an exemplary embodiment.

In some embodiments, the electronic apparatus further includes a discharge circuit, a first terminal of the discharge circuit is connected to the battery, a second terminal of the discharge circuit is grounded, and a control terminal of the discharge circuit is electrically connected to the processor or the battery management circuit. Referring to FIG. 9, the method further includes the following steps.

In step 91, when the control terminal of the discharge circuit is electrically connected to the battery management circuit, the battery management circuit generates a discharge control instruction signal when finishing charging of the battery, and sends the discharge control instruction signal to the control terminal of the discharge circuit.

In step 92, when receiving the discharge control instruction signal, the discharge circuit discharges to release the residual voltage on the power line between the power supply and the battery management circuit.

In the embodiments, the control terminal of the discharge circuit is electrically connected to the processor; the processor generates a discharge control instruction signal when ceasing charging of the battery, and sends the discharge control instruction signal to the control terminal of the discharge circuit; the discharge circuit discharges when receiving the discharge control instruction to release the residual voltage on the power line between the power supply and the battery management circuit.

The charging method in the above embodiments has been described in detail in the apparatus embodiments illustrated in FIG. 1 to FIG. 6, and will not be repeated here.

Figure 10:
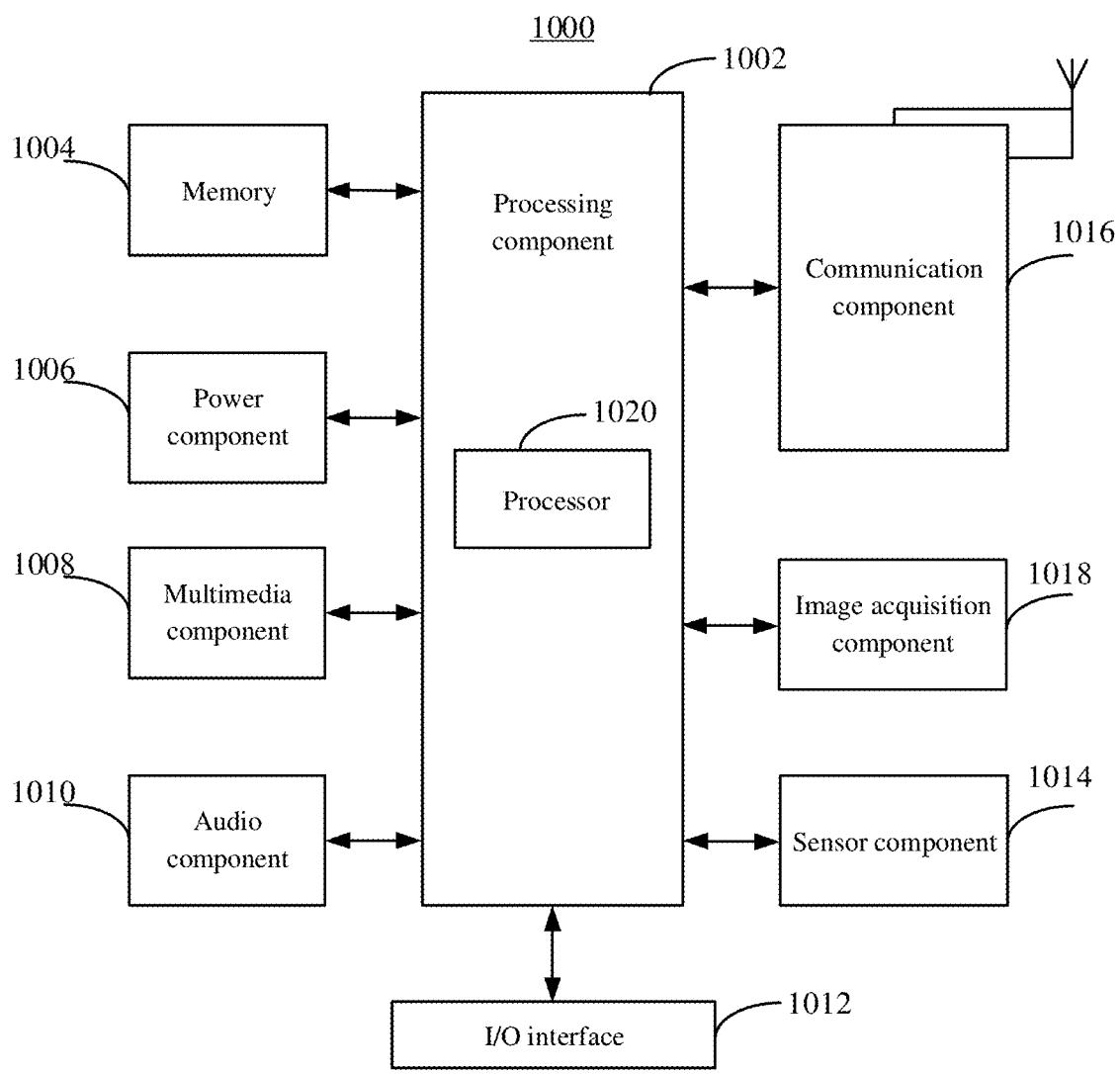
FIG. 10 is a block diagram of an electronic apparatus according to an exemplary embodiment.

FIG. 10 is a block diagram of an electronic apparatus 1000 according to an exemplary embodiment. For example, the electronic apparatus 1000 may be a smart phone, a computer, a digital broadcasting terminal, a tablet device, a medical device, a fitness device, a personal digital assistant, etc., including the circuits shown in FIG. 2 to FIG. 5.

Referring to FIG. 10, electronic apparatus 1000 can include one or more of the following components: a processing component 1002, a memory 1004, a power component 1006, a multimedia component 1008, an audio component 1010, an input/output (I/O) interface 1012, a sensor component 1014, a communication component 1016, and an image capturing component 1018.

Processing component 1002 typically controls the overall operation of electronic apparatus 1000, such as operations associated with display, telephone calls, data communications, camera operations, and recording operations. Processing component 1002 can include one or more processors 1020 to execute instructions. Moreover, processing component 1002 can include one or more modules to facilitate interaction between component 1002 and other components. For example, processing component 1002 can include a multimedia module to facilitate interaction between multimedia component 1008 and processing component 1002.

Memory 1004 is configured to store various types of data to support operation at electronic apparatus 1000. Examples of such data include instructions for any application or method operating on electronic apparatus 1000, contact data, phone book data, messages, pictures, videos, and the like. Memory 1004 can be implemented by any type of volatile or non-volatile storage device or a combination thereof, such as static random access memory (SRAM), electrically erasable programmable read only memory (EEPROM), erasable programmable Read Only Memory (EPROM), programmable Read Only Memory (PROM), Read Only Memory (ROM), Magnetic Memory, Flash Memory, Disk or Optical Disk.

Power component 1006 provides power to various components of electronic apparatus 1000. Power component 1006 can include a power management system, one or more power supplies, and other components associated with generating, managing, and distributing power for electronic apparatus 1000.

Multimedia component 1008 includes a screen between electronic apparatus 1000 and a target object that provides an output interface. In some examples, the screen can include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. The touch sensor may sense not only the boundary of the touch or sliding action, but also the duration and pressure associated with the touch or slide operation.

Audio component 1010 is configured to output and/or input an audio signal. For example, audio component 1010 includes a microphone (MIC) that is configured to receive an external audio signal when electronic apparatus 1000 is in an operational mode, such as a call mode, a recording mode, and a voice recognition mode. The received audio signal may be further stored in memory 1004 or transmitted via communication component 1016. In some examples, audio component 1010 also includes a speaker for outputting an audio signal.

I/O interface 1012 provides an interface between the processing component 1002 and the peripheral interface module, which may be a keyboard, a click wheel, a button, or the like.

Sensor component 1014 includes one or more sensors for providing electronic apparatus 1000 with a status assessment of various aspects. For example, sensor component 1014 can detect a turned-on/turned-off state of electronic apparatus 1000, a relative positioning of components, such as the display and keypad of electronic apparatus 1000, and sensor component 1014 can also detect a change in position of electronic apparatus 1000 or a component of electronic apparatus 1000, the presence or absence of user contact with electronic apparatus 1000, orientation or acceleration/deceleration of electronic apparatus 1000, and temperature change of electronic apparatus 1000.

Communication component 1016 is configured to facilitate wired or wireless communication between electronic apparatus 1000 and other devices. Electronic apparatus 1000 can access a wireless network based on a communication standard, such as WiFi, 4G or 5G, or a combination thereof. In an exemplary embodiment, communication component 1016 receives broadcast signals or broadcast associated information from an external broadcast management system via a broadcast channel In an exemplary embodiment, communication component 1016 also includes a near field communication (NFC) module to facilitate short range communication. In an exemplary embodiment, communication component 1016 can be implemented based on radio frequency identification (RFID) technology, infrared data association (IrDA) technology, ultra-wideband (UWB) technology, Bluetooth (BT) technology, and other technologies.

In an exemplary embodiment, electronic apparatus 1000 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic elements.

In an exemplary embodiment, there is also provided a non-transitory computer storage medium including instructions, such as memory 1004 including instructions executable by processor 1020 of electronic apparatus 1000. For example, the non-transitory computer storage medium may be a ROM, a random access memory (RAM), a CD-ROM, a magnetic tape, a floppy disk, and an optical data storage device.

Other implementations of the present disclosure will be readily apparent to those skilled in the art after considering the disclosure. The present application is intended to cover any variations, uses, or adaptations of the present disclosure, which are in accordance with the general principles of the present disclosure and include common general knowledge or conventional technical means in the art that are not disclosed in the present disclosure. The embodiments are examples, and the scope and spirit of the disclosure are indicated by appended claims.

It is to be understood that the present disclosure is not limited to the above described structures in the drawings, and various changes and modifications can be made to the disclosure without departing from the scope thereof. The scope of the disclosure is to be limited only by the appended claims.

What is claimed is:

1. An electronic apparatus, comprising:
a display;
a processor configured to, when a battery of the electronic apparatus is to be charged, obtain a display state of the display and generate a mode-selection signal according to the display state; and
a battery management circuit connected to the processor and configured to, upon receiving the mode-selection signal, switch to one of a charge pump charging mode or a direct charging mode based on the mode-selection signal to charge the battery,
wherein the battery management circuit comprises a digital control circuit, at least one charge pump control circuit, and a direct charge control circuit;
a first terminal of the digital control circuit is connected to the processor, a second terminal of the digital control circuit is connected to a second terminal of the charge pump control circuit, a third terminal of the digital control circuit is connected to a first terminal of the direct charge control circuit, and a first terminal of the charge pump control circuit and a second terminal of the direct charge control circuit are connected to the battery; and
the digital control circuit is configured to:
in response to receiving the mode-selection signal, generate a circuit control instruction signal based on the mode-selection signal; and
send the circuit control instruction signal to the charge pump control circuit and the direct charge control circuit, to control a power supply to charge the battery through one of the charge pump control circuit or the direct charge control circuit.

2. The electronic apparatus according to claim 1, further comprising:
a first capacitor and a second capacitor each electrically connected to the battery management circuit,
wherein the charge pump control circuit comprises: a first switching device, a second switching device, a third switching device, and a fourth switching device;
a first terminal of the first switching device is electrically connected to the power supply, a second terminal of the first switching device is electrically connected to a first terminal of the second switching device, and is electrically connected to a first terminal of the first capacitor;
a first terminal of the third switching device is electrically connected to a second terminal of the second switching device, and is electrically connected to a first terminal of the second capacitor, and a second terminal of the second capacitor is grounded;
a first terminal of the fourth switching device is electrically connected to a second terminal of the third switching device, and is electrically connected to a second terminal of the first capacitor, and a second terminal of the fourth switching device is grounded; and
each of a control terminal of the first switching device, a control terminal of the second switching device, a control terminal of the third switching device and a control terminal of the fourth switching device is electrically connected to the digital control circuit.

3. The electronic apparatus according to claim 1, wherein:
the at least one charge pump control circuit comprises a plurality of charge pump control circuits, and the battery management circuit is configured to control the power supply to charge the battery through at least one of the plurality of charge pump control circuits.

4. The electronic apparatus according to claim 2, wherein:
the direct charge control circuit comprises a fifth switching device; and
a first terminal of the fifth switching device is electrically connected to the power supply, and a second terminal of the fifth switching device is electrically connected to a second terminal of the second switching device; and
a control terminal of the fifth switching device is electrically connected to the digital control circuit.

5. The electronic apparatus according to claim 4, wherein:
the fifth switching device comprises a field-effect transistor, a first diode, and a second diode;
a drain of the field-effect transistor is electrically connected to the first terminal of the fifth switching device, a source of the field-effect transistor is electrically connected to the second terminal of the fifth switching device, and a gate of the field-effect transistor is electrically connected to the control terminal of the fifth switching device; and
a cathode of the first diode is electrically connected to the drain of the field-effect transistor, an anode of the first diode is electrically connected to an anode of the second diode, and a cathode of the second diode is electrically connected to the source of the field-effect transistor.

6. The electronic apparatus according to claim 5, wherein:
an impedance of the field-effect transistor in the fifth switching device is less than or equal to a preset impedance.

7. The electronic apparatus according to claim 1, further comprising:
a discharge circuit,
wherein a first terminal of the discharge circuit is connected to the battery, a second terminal of the discharge circuit is grounded, and a control terminal of the discharge circuit is electrically connected to one of the processor or the battery management circuit; and wherein the one of the processor or the battery management circuit is further configured to generate a discharge control instruction signal when ceasing charging to the battery, and send the discharge control instruction signal to the control terminal of the discharge circuit; and the discharge circuit is configured to discharge upon receiving the discharge control instruction signal, to release a residual voltage on a power line between the power supply and the battery management circuit.

8. The electronic apparatus according to claim 7, wherein:
the discharge circuit comprises a sixth switching device and a discharge resistor;
a first terminal of the sixth switching device is electrically connected to the power supply, a second terminal of the sixth switching device is electrically connected to a first terminal of the discharge resistor, and a second terminal of the discharge resistor is grounded; and
a control terminal of the sixth switching device is electrically connected to the one of the processor or the battery management circuit.

9. A charging method, applied to an electronic apparatus comprising a display, a processor, and a battery management circuit, the method comprising:
obtaining, by the processor, a display state of the display when a battery of the electronic apparatus is to be charged;
generating, by the processor, a mode-selection signal based on the display state and sending the mode-selection signal to the battery management circuit; and
upon receiving the mode-selection signal, switching, by the battery management circuit, to one of a charge pump charging mode or a direct charging mode based on the mode-selection signal to charge the battery,
wherein the battery management circuit comprises a digital control circuit, at least one charge pump control circuit, and a direct charge control circuit; and switching, by the battery management circuit, to one of the charge pump charging mode or the direct charging mode based on the mode-selection signal to charge the battery comprises:
in response to receiving the mode-selection signal, generating, by the digital control circuit, a circuit control instruction signal based on the mode-selection signal; and
sending, by the digital control circuit, the circuit control instruction signal to the charge pump control circuit and the direct charge control circuit, to control a power supply to charge the battery through one of the charge pump control circuit or the direct charge control circuit.

10. The charging method according to claim 9, wherein the at least one charge pump control circuit comprises a plurality of charge pump control circuits, and the battery management circuit is configured to control the power supply to charge the battery through at least one of the plurality of charge pump control circuits.

11. The charging method according to claim 9, wherein the direct charge control circuit comprises a fifth switching device; a first terminal of the fifth switching device is electrically connected to the power supply, a second terminal of the fifth switching device is electrically connected to a second terminal of a second switching device, and a control terminal of the fifth switching device is electrically connected to the digital control circuit; and sending, by the digital control circuit, the circuit control instruction signal to control the power supply to charge the battery comprises:
sending, by the digital control circuit to the fifth switching device and the charge pump control circuit, the circuit control instruction signal for instructing the fifth switching device to be turned on and the charge pump control circuit to be turned off, to control the power supply to charge the battery through the fifth switching device.

12. The charging method according to claim 9, wherein the electronic apparatus further comprises a discharge circuit, a first terminal of the discharge circuit being connected to the battery, a second terminal of the discharge circuit being grounded, and a control terminal of the discharge circuit being electrically connected to one of the processor or the battery management circuit, the method further comprising:
generating, by the one of the processor or the battery management circuit, a discharge control instruction signal when ceasing charging to the battery, and sending the discharge control instruction signal to the control terminal of the discharge circuit; and
discharging, by the discharge circuit, upon receiving the discharge control instruction signal, to release a residual voltage on a power line between a power supply and the battery management circuit.

13. A non-transitory computer-readable storage medium having stored thereon instructions that, when executed by a processor of an electronic apparatus comprising the processor, a display, and a battery management circuit, cause the electronic apparatus to perform a charging method, the method comprising:
obtaining, by the processor, a display state of the display when a battery of the electronic apparatus is to be charged;
generating, by the processor, a mode-selection signal based on the display state and sending the mode-selection signal to the battery management circuit; and
upon receiving the mode-selection signal, switching, by the battery management circuit, to one of a charge pump charging mode or a direct charging mode based on the mode-selection signal to charge the battery,
wherein the battery management circuit comprises a digital control circuit, at least one charge pump control circuit, and a direct charge control circuit; and switching, by the battery management circuit, to one of the charge pump charging mode or the direct charging mode based on the mode-selection signal to charge the battery comprises:
in response to receiving the mode-selection signal, generating, by the digital control circuit, a circuit control instruction signal based on the mode-selection signal; and
sending, by the digital control circuit, the circuit control instruction signal to the charge pump control circuit and the direct charge control circuit, to control a power supply to charge the battery through one of the charge pump control circuit or the direct charge control circuit.

* * * * *